United States Patent
Arita

(10) Patent No.: US 12,454,252 B2
(45) Date of Patent: Oct. 28, 2025

(54) JACK DEVICE AND WORK MACHINE EQUIPPED WITH SAME

(71) Applicant: KOBELCO CONSTRUCTION MACHINERY CO., LTD., Hiroshima (JP)

(72) Inventor: Ryuichi Arita, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 309 days.

(21) Appl. No.: 18/044,643

(22) PCT Filed: Sep. 14, 2021

(86) PCT No.: PCT/JP2021/033775
§ 371 (c)(1),
(2) Date: Mar. 9, 2023

(87) PCT Pub. No.: WO2022/070890
PCT Pub. Date: Apr. 7, 2022

(65) Prior Publication Data
US 2023/0331198 A1 Oct. 19, 2023

(30) Foreign Application Priority Data
Sep. 30, 2020 (JP) ................. 2020-165606

(51) Int. Cl.
*B60S 9/00* (2006.01)
*B60S 9/10* (2006.01)
(Continued)

(52) U.S. Cl.
CPC ............ *B60S 9/10* (2013.01); *B66F 3/247* (2013.01); *B66F 3/26* (2013.01); *B66C 23/78* (2013.01); *E02F 9/085* (2013.01)

(58) Field of Classification Search
CPC .............. B60S 9/10; B60S 9/12; B60S 11/00
See application file for complete search history.

(56) References Cited

U.S. PATENT DOCUMENTS 3,955,695 A * 5/1976 Maurer ............ B60S 9/10
212/292
10,124,773 B1 * 11/2018 Mourlam .......... B60S 9/12
(Continued)

FOREIGN PATENT DOCUMENTS

JP 48-35515 5/1973
JP 11-100191 A 4/1999
(Continued)

OTHER PUBLICATIONS

International Search Report mailed on Nov. 30, 2021 in PCT/JP2021/033775 filed on Sep. 14, 2021 (2 pages).

*Primary Examiner* — Lee D Wilson
(74) *Attorney, Agent, or Firm* — Oblon, McClelland, Maier & Neustadt, L.L.P.

(57) ABSTRACT

Provided is a jack device rendering an operation of changing the posture of a jack cylinder easy without using a device that actively changes the posture. The jack device includes an arm, a jack body including the jack cylinder, and a reaction-force application unit supported by the arm. The reaction-force application unit makes a reaction-force moment act on the jack body in all postures from the upright posture to the storage posture in response to a force applied from the jack body. The reaction-force application unit makes a reaction-force moment greater than a self-weight moment act on the jack body in the storage posture and makes a reaction-force moment smaller than the self-weight moment act on the jack body in the upright posture.

5 Claims, 8 Drawing Sheets

(51) Int. Cl.
    *B66F 3/24*     (2006.01)
    *B66F 3/26*     (2006.01)
    *B66C 23/78*     (2006.01)
    *E02F 9/08*     (2006.01)

(56) References Cited

U.S. PATENT DOCUMENTS

2022/0001842 A1\*   1/2022   Froland .................. B60P 1/027
2023/0331198 A1\*   10/2023   Arita ......................... B60S 9/10

FOREIGN PATENT DOCUMENTS

| | | |
|---|---|---|
| JP | 2012-116604 A | 6/2012 |
| JP | 2018-177432 A | 11/2018 |
| JP | 2019-99349 A | 6/2019 |

\* cited by examiner

JACK DEVICE AND WORK MACHINE EQUIPPED WITH SAME

TECHNICAL FIELD

The present invention relates to a jack device to be provided in a work machine including a machine body to lift up the machine body, and a work machine including the same.

BACKGROUND ART

Conventionally known is a jack device described in, for example, Patent Literature 1. The jack devices described in the literature 1 includes a jack cylinder and a drive cylinder. The drive cylinder is composed of a hydraulic cylinder to shift the posture of the jack cylinder between a work posture and a storage posture. The work posture is a posture where the jack cylinder is upright, while the storage posture is a posture where the jack cylinder is tilted.

The inclusion of the drive cylinder, which is an actuator to actively move the jack device, in the jack device increases the frequency of maintenance for and failure in the jack device and complicates the construction of the jack device. On the other hand, to change the posture of the jack cylinder only by manual operation by an operator with nonuse of the drive cylinder may involve significantly increased burden on the operator.

CITATION LIST

Patent Literature

Patent Literature 1: Japanese Unexamined Patent Publication No. 2012-116604

SUMMARY OF INVENTION

It is an object of the present invention to provide a jack device that includes a jack cylinder and enables an operator to easily change the posture of the jack cylinder with no requirement for a device to actively move the jack cylinder.

Provided is a jack device mounted on a machine body of a work machine to lift up the machine body. The jack device includes an arm, a jack body, and a reaction-force application unit. The arm is mountable on the machine body so as to be rotatable about an arm rotation axis extending in a machine up-down direction, which is an up-down direction of the machine body. The jack body includes a jack cylinder expandable and contractable in a cylinder expansion-contraction direction, attached to the arm rotatably about a cylinder rotation axis to be shiftable between an upright posture and a storage posture. The upright posture is a posture where the machine body can be lifted up by expansion of the jack cylinder. The storage posture is a posture where the cylinder expansion-contraction direction is tilted from the machine up-down direction more largely than the upright posture and the jack cylinder lies along an upper surface of the arm. The reaction-force application unit is supported by the arm and applies a reaction force to the jack body in response to a force applied from the jack body. The reaction-force application unit makes a reaction-force moment act on the jack body in all postures from the upright posture to the storage posture. The reaction-force moment is a moment caused by the reaction force about the cylinder rotation axis, having a direction to make the jack body closer to the storage posture. The reaction-force application unit is configured to make the reaction-force moment greater than a self-weight moment act on the jack body in the storage posture and configured to make the reaction-force moment smaller than the self-weight moment act on the jack body in the upright posture. The self-weight moment is a moment caused by the weight of the jack body about the cylinder rotation axis, having a direction to make the jack body closer to the upright posture.

DETAILED DESCRIPTION

There will be described an embodiment of the present invention with reference to FIGS. 1 to 8.

Figure 1:
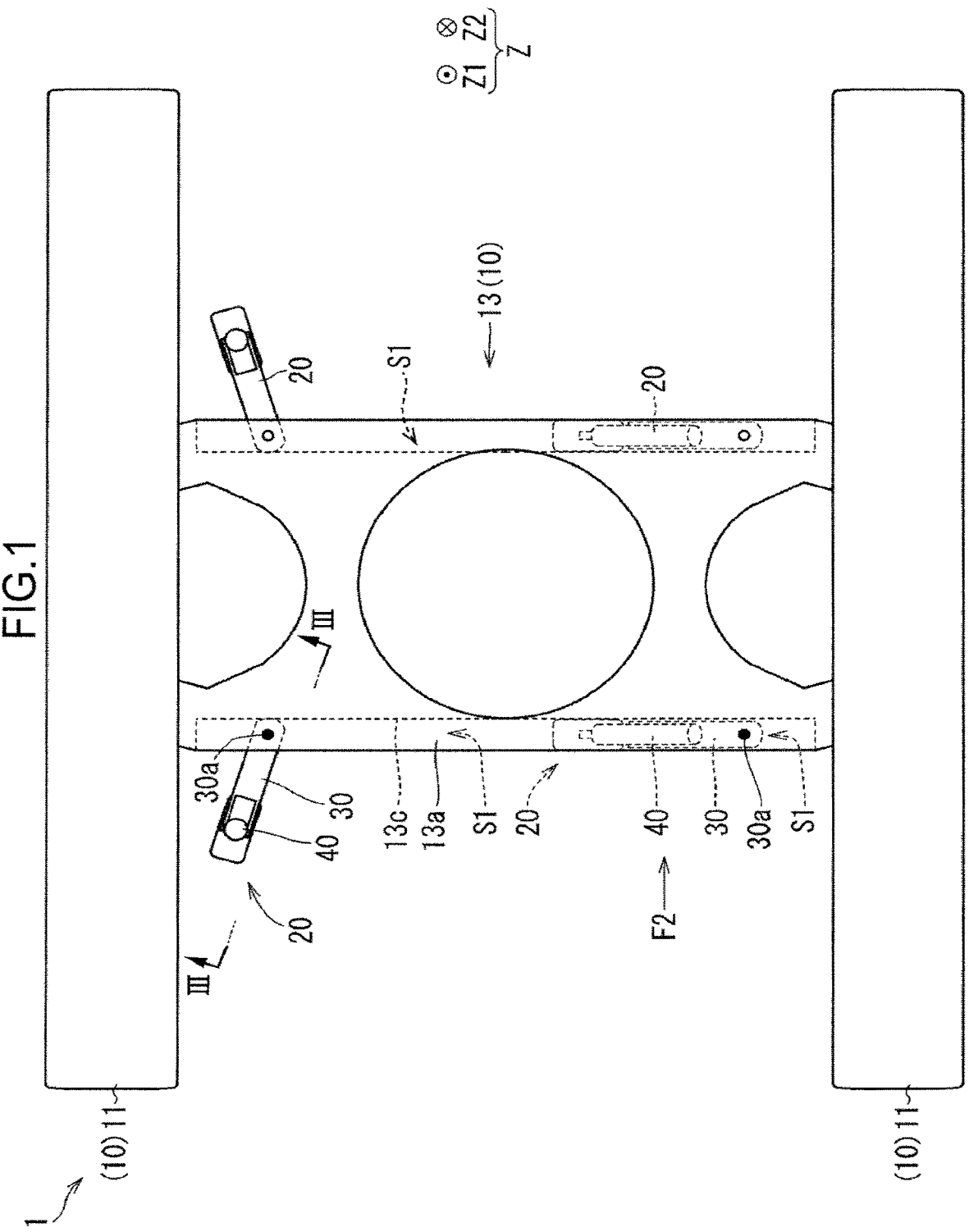
FIG. 1 is a plan view of a work machine including a plurality of jack devices according to an embodiment of the present invention.

FIG. 1 shows a work machine 1 according to the embodiment. The work machine 1 is a machine for performing work, for example, a construction machine for performing a construction work. The work machine 1 may be, for example, either a crane or an excavator.

The work machine 1 includes a machine body 10 and a plurality of jack devices 20.

The machine body 10 is a main part of the work machine 1. The machine body 10 may be either, for example, a lower traveling body or an upper turning body turnably mounted on the lower traveling body. The machine body 10 shown in FIG. 1 is the lower traveling body, including a pair of left and right crawlers 11 and a car body 13 disposed between the pair of crawlers 11. The pair of crawlers 11 make motions to allow the entire machine body 10 to travel along the ground.

The machine body 10 has a machine up-down direction Z, a machine longitudinal direction, and a machine lateral direction. The machine up-down direction Z is the up-down direction of the machine body 10, being a direction coincident with the vertical direction when the machine body 10 is placed on a horizontal plane. The following description is made about the case where the machine body 10 is placed on a horizontal plane. The machine front-rear direction is a direction orthogonal to the machine up-down direction Z and orthogonal to the machine lateral direction. The machine front-rear direction is, for example, a longitudinal direction of each of the crawlers 11, 11. The machine lateral direction is a direction orthogonal to each of the machine up-down direction Z and the machine front-rear direction, for example, being the direction in which the pair of crawlers 11 are arranged.

On the car body 13 is mounted each of the jack devices 20. The plurality of jack devices 20, in the present embodiment, include four jack devices 20, namely, left and right front-side jack devices 20 aligned in the machine lateral direction along the front side of the car body 13, and left and right rear-side jack devices 20 aligned in the machine lateral direction along the rear side of the car body 13. To the car body 13 are connected the pair of crawlers 11 disposed on both outer sides of the car body 13 in the machine lateral direction, i.e., left and right sides, respectively. On the car body 13 is mounted a not-graphically-shown upper turning body, for example, through a turning bearing.

Figure 2:
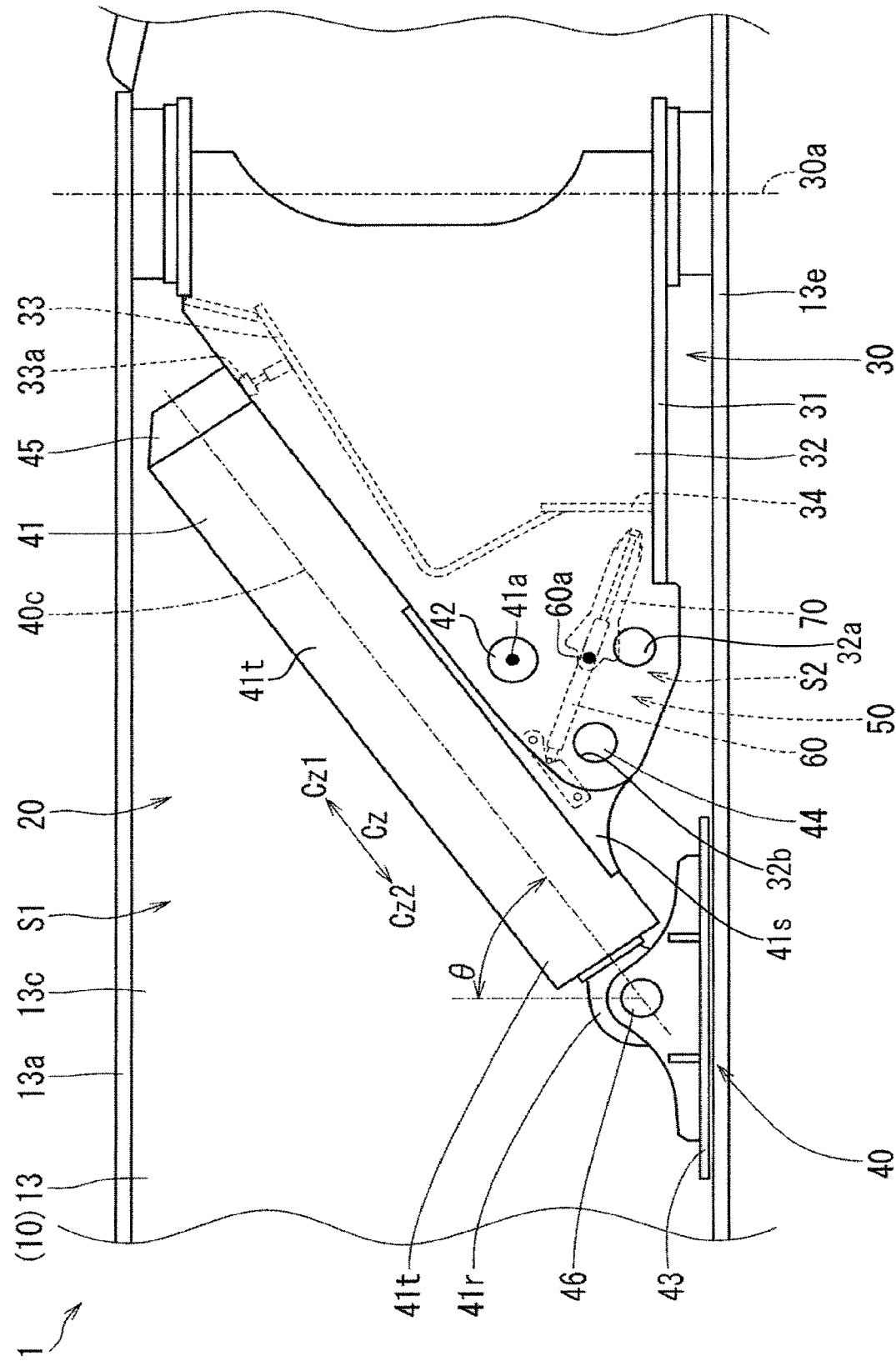
FIG. 2 is a front view of a jack device where a jack body is in a storage state, out of the plurality of jack devices, and a storage space for storing the jack device, which are viewed in a direction indicated by arrow II in FIG. 1.

The car body 13 includes a top wall 13a, a pair of front and rear side walls 13c, 13c, and a bottom wall 13e shown in FIG. 2, each of which is composed of, for example, a plate-like member. The top wall 13a forms an upper part of the car body 13. The pair of side walls 13c, 13c form a front side part and a rear side art, respectively, the parts being opposite ends of the car body 13 in the machine front-rear direction, respectively. The bottom wall 13e shown in FIG. 2 forms the lower part of the car body 13. The bottom wall 13e is disposed under the top wall 13a at a vertical distance from the top wall 13a. Each of the side walls 13c is disposed between the top wall 13a and the bottom wall 13e, having an upper end connected to the top wall 13a and a lower end connected to the bottom wall 13e. The front end of the top wall 13a, the front end of the bottom wall 13e, and the front side wall 13c out of the pair of side walls 13c define a front storage space S1 (on upper side in FIG. 1), while the rear end of the top wall 13a, the rear end of the bottom wall 13e, and the rear side wall 13c out of the pair of side walls 13c define a rear storage space S1 (on lower side in FIG. 1). Each of the storage spaces S1 is a space for storing the plurality of jack devices 20.

Figure 3:
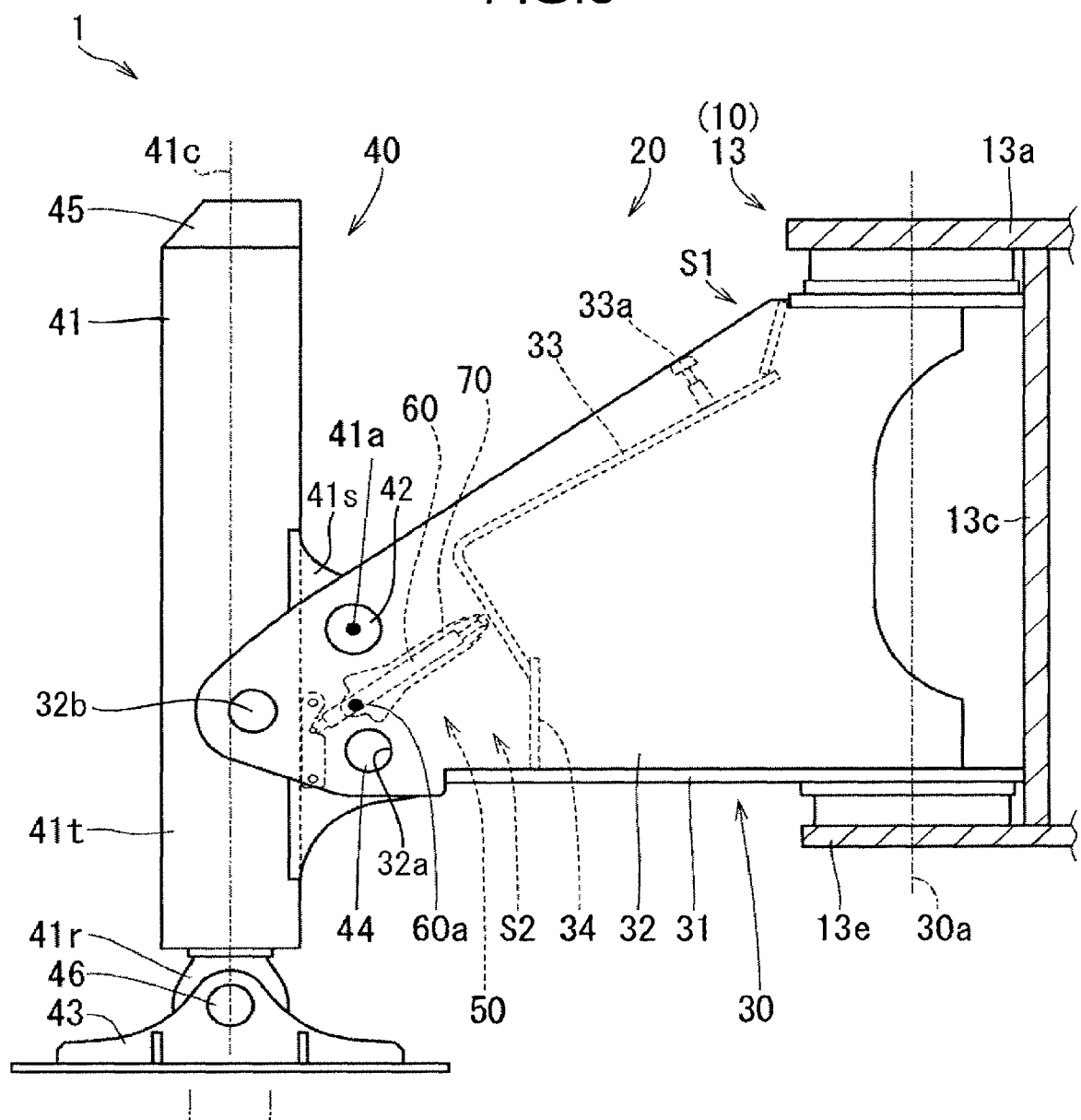
FIG. 3 is a cross-sectional view showing a jack device where the jack body is in an upright state, out of the plurality of jack devices, in the cross-section taken along line III-III in FIG. 1.

Each of the jack devices 20 can be mounted on the machine body 10 to lift up the machine body 10, that is, to raise the machine body 10 relatively to the ground. During work by, and transportation of, the work machine 1, each of the jack devices 20 is shifted to a storage state of being stored in the storage space S1. As shown in FIG. 3, for assembly and disassembly of the work machine 1, each of the jack devices 20 is shifted to a use state for lifting up the machine body 10.

Each of the jack devices 20 includes an arm 30, a jack body 40, and an assistance mechanism 50.

The arm 30 interconnects the machine body 10 and the jack body 40. The arm 30 is connected to the machine body 10 so as to be rotatable about an arm rotation axis 30a. The arm 30 has, for example, a box-shaped structure. The arm 30 according to the present embodiment includes an arm bottom wall 31, a pair of arm side walls 32, 32, an arm top wall 33, and an arm inner wall 34.

The arm rotation axis 30a extends in the machine up-down direction Z. The arm 30 has an arm rotation-radius direction Ax and an arm width direction Ay. The arm rotation-radius direction Ax is a direction parallel to the rotation radius of the rotation of the arm about the arm rotation axis 30a, that is, a direction orthogonal to the rotation direction of the arm 30, corresponding to the longitudinal direction of the arm 30, in the present embodiment, when viewed along the machine up-down direction Z, that is, when viewed from above. The arm rotation-radius direction Ax involves an arm distal side Ax1 and an arm proximal side Ax2. The arm distal side Ax1 is a side far from the arm rotation axis 30a, and the arm proximal side Ax2 is the side opposite thereto, that is, a side close to the arm rotation axis 30a. The arm width direction Ay is a direction orthogonal to each of the arm rotation-radius direction Ax and the machine up-down direction Z. The shape of the arm 30 viewed along the arm width direction Ay is, for example, a substantially triangular shape.

The arm bottom wall 31 forms a lower part of the arm 30, i.e., a part including a bottom surface. The arm bottom wall 31 is, for example, a plate-like member. The arm bottom wall 31 is disposed so as to extend in the arm width direction Ay and the arm rotation-radius direction Ax.

The pair of arm side walls 32, 32 form opposite side parts of the arm 30 with respect to the arm width direction Ay, i.e., parts including left and right side surfaces, respectively. Each of the arm side walls 32, 32 is, for example, a plate-like member. The arm side wall 32 shown in FIG. 2 includes a main part and a protruding part. The main part is located directly above the arm bottom wall 31. The protruding part protrudes to the arm distal side Ax1 beyond the end of the arm bottom wall 31 on the arm distal side Ax1 (left side end in FIG. 2). Each of the arm side walls 32, 32 is disposed so as to extend in the arm rotation-radius direction Ax and the machine up-down direction 7.

The arm top wall 33 forms an upper part of the arm 30, i.e., a part including an upper surface. The arm top wall 33 includes a top wall body, for example, formed of a plate-like member, and a cylinder rotation restriction member 33a.

The top wall body of the arm top wall 33 interconnects respective upper ends of the pair of (left and right) arm side walls 32 in the arm width direction Ay. The top wall body is disposed so as to extend in the arm width direction Ay. The top wall body, for example, extends obliquely downward toward the arm distal side Ax1, thus inclined to the arm rotation-radius direction Ax. The top wall body, alternatively, may be disposed so as to extend in a direction coincident with the arm rotation-radius direction Ax with no inclination to the arm rotation-radius direction Ax.

The cylinder rotation restriction member 33a projects upward from the upper surface of the top of the top wall body, for example, in the normal direction to the upper surface, i.e., upward to the arm distal side Ax1.

The arm inner wall 34 is disposed internally of the arm 30. The arm inner wall 34 is, for example, a plate-like member. The arm inner wall 34 interconnects respective appropriate parts of the pair of (left and right) arm side walls 32 in the arm width direction Ay. The arm inner wall 34 is disposed so as to extend in the arm width direction Ay and the machine up-down direction Z, for example. The arm inner wall 34 shown in FIG. 3 includes an inner wall lower part and an inner wall upper part. The inner wall lower part extends in a direction coincident with the machine up-down direction Z. The inner wall upper part extends upward from the upper end of the inner wall lower part to the arm distal side Ax1, thus inclined to the machine up-down direction Z. The arm inner wall 34 shown in FIG. 3 is disposed in a center region of the arm 30 with respect to the arm rotation-radius direction Ax. More specifically, the arm inner wall 34 is located in the vicinity of the center of the arm 30 with respect to the arm rotation-radius direction Ax and deviated from the center to the arm distal side Ax1.

The arm 30 defines a disposition space S2 and allows the assistance mechanism 50 to be disposed in the disposition space S2. The disposition space S2, in the present embodiment, is a space (cavity) between the pair of (left and right) arm side walls 32, 32 and on the arm distal side Ax1 of the arm inner wall 34.

The jack body 40 includes a jack cylinder 41, a float 43, and a jack weight 45. The jack body 40 is supported by the arm 30 so as to be rotatable relatively to the arm 30 about a cylinder rotation axis 41a. The cylinder rotation axis 41a extends in the arm width direction Ay, which is the direction orthogonal to each of the machine up-down direction Z and the arm rotation-radius direction Ax.

The jack cylinder 41 is expandable and contractable in a cylinder expansion-contraction direction Cz. The jack cylinder 41 is, for example, a hydraulic cylinder.

The cylinder expansion-contraction direction Cz is a direction along a cylinder center axis 41c, which is the center axis of the jack cylinder 41, being the longitudinal direction of the jack cylinder 41 in the present embodiment. In FIG. 3, the most-contraction state where the jack cylinder 41 is most contracted is indicated by the solid line, and a state where the jack cylinder 41 is more expanded than the most-contraction state is indicated by the two-dot chain line.

The jack body 40 including the jack cylinder 41 can be shifted between an upright posture shown in FIG. 3 and a storage posture shown in FIG. 2, by rotation thereof relative to the arm 30 about the cylinder rotation axis 41a.

The upright posture is a posture where the jack cylinder 41 is upright. Specifically, the upright posture is a posture where the cylinder expansion-contraction direction Cz is coincident or substantially coincident with the machine up-down direction Z.

In the storage posture shown in FIG. 2, the jack body 40 is disposed so as to lay the jack cylinder 41 substantially along the top of the arm 30 (e.g., the upper surface of the arm top wall 33). The storage posture in the present embodiment is a posture where the cylinder center axis 40c of the jack cylinder 41 is tilted, being a posture where the tilt of the cylinder center axis 40c from the machine up-down direction Z is larger than that in the upright posture. In other words, the storage posture is a posture where the jack cylinder 41 is tilted toward the arm 30 compared to the upright posture, the cylinder center axis 40c being inclined to both the vertical direction and the horizontal direction. More specifically, in the storage posture, the cylinder expansion-contraction direction Cz is a direction extending downward to the arm distal side Ax1. In the storage posture, the jack cylinder 41 is prevented from rotation in a direction to increase the jack tilt angle θ, by contact of the jack cylinder 41 with the cylinder rotation restriction member 33a, thereby keeping the jack body 40 in the storage posture. The jack tilt angle θ is the angle of the cylinder center axis 41c to the machine up-down direction Z (the vertical direction when the machine body 10 is placed on a horizontal plane), as shown in FIG. 2. The jack tilt angle θ is 0° in the upright posture of the jack body 40, increased with the displacement of the jack body 40 from the upright posture to the storage posture. The storage posture may be a posture where the cylinder expansion-contraction direction Cz.

As shown in FIG. 3, the jack cylinder 41 includes a cylinder tube 41t, a cylinder rod 41r, and a lug part 41s.

The cylinder tube 41t is cylindrical around the cylinder center axis 41c and holds the cylinder rod 41r. The lug part 41s protrudes from the outer peripheral surface of the cylinder tube 41t to the arm proximal side Ax2 along the radius direction of the cylinder tube 41t. The lug part 41s is supported by the arm 30 so as to be rotatable about the cylinder rotation axis 41a. Specifically, the lug part 41s is rotatably supported by the arm 30 through a cylinder support shaft 42 having a center axis, which corresponds to the cylinder rotation axis 41a. The cylinder support shaft 42 passes through the lug part 41s and respective end parts of each of the arm side walls 32, 32 on the arm distal side Ax1 side, in the arm width direction Ay, in the state where the lug part 41s and the pair of arm side walls 32, 32 of the arm 30 overlap each other in the arm width direction Ay, thereby enabling the lug part 41s to be supported by the arm 30 through the cylinder support shaft 42 while allowing the lug part 41s to rotate relatively to the arm 30 about the center axis of the cylinder support shaft 42.

The cylinder rod 41r is disposed radially inside the cylinder tube 41t, as shown in FIG. 3. The cylinder tube 41t holds the cylinder rod 41r so as to render the cylinder rod 41r movable relatively to the cylinder tube 41t in the cylinder expansion-contraction direction Cz, thereby allowing the entire jack cylinder 41 to be expanded and contracted in the cylinder expansion-contraction direction Cz.

The cylinder expansion-contraction direction Cz involves a cylinder proximal side Cz1 and a cylinder distal side Cz2. The cylinder distal side Cz2 is a side to which the cylinder rod 41r protrudes beyond the cylinder tube 41t, being the lower side in the upright posture shown in FIG. 3. The cylinder proximal side Cz1 is a side to which the cylinder rod 41r is retracted into the cylinder tube 41t, being the upper side in the upright posture shown in FIG. 3.

Each of the jack devices 20 further includes a cylinder fixing pin 44 shown in FIGS. 2 to 5. The cylinder fixing pin 44 is capable of restricting the rotation of the jack body 40 relative to the arm 30 about the cylinder rotation axis 41a in each of the upright posture and the storage posture, thereby enabling the jack body 40 to be fixed in each of the upright posture and the storage posture. Specifically, the lug part 41s of the jack cylinder 41 is provided with a pin insertion hole 41h, while each of the arm side walls 32, 32 is provided with a first pin insertion hole 32a and a second pin insertion hole 32b. Each of the pin insertion hole 41h and the first and second pin insertion holes 32a, 32b has a hole diameter to allow the cylinder fixing pin 44 to be inserted into the hole with substantially no clearance. The first pin insertion hole 32a is positioned to enable the jack cylinder 41 to be fixed in the upright posture by the cylinder fixing pin 44 inserted into the first pin insertion hole 32a and the pin insertion hole 41h. The second pin insertion hole 32b is positioned to enable the jack cylinder 41 to be fixed in the storage posture by the cylinder fixing pin 44 inserted into the second pin insertion hole 32b and the pin insertion hole 41h. To restrict the rotation of the jack body 40 in each of the upright posture and the storage posture, alternatively, may be prepared different pins from each other, namely, an upright-posture holding pin and a storage-posture holding pin.

The float 43 is both connectable to the distal end of the cylinder rod 41r and contactable with the ground. The float 43 may make either indirect contact with the ground across an interposed object such as a plate or direct contact with the ground. The distal end of the cylinder rod 41r is the end of the cylinder rod 41r on the cylinder distal side Cz2. The float 43 is connected to the distal end of the cylinder rod 41r through a float connection pin 46 extending in the arm width direction Ay, being allowed to rotate about the center axis of the float connection pin 46, that is, a rotation axis extending in the arm width direction Ay. The float 43 is detachably connected to the cylinder rod 41r through the float connection pin 46. The float 43 may be connected to the cylinder rod 41r rotatably in a plurality of directions within a predetermined angular range or in all directions (i.e., freely). For example, a spherical bearing may be interposed between the cylinder rod 41r and the float connection pin 46, or between the float connection pin 46 and the float 43. Allowing the float 43 to rotate relatively to the cylinder rod 41r freely within a predetermined angular range enables the float 43 to be inclined following the inclination of the ground.

The jack weight 45 is a weight for adjusting a weight moment Ms, namely, a balance weight. The self-weight moment Ms is a moment caused by the weight of the jack body 40, being a moment in a direction to make the jack body 40 closer to the upright posture from the storage posture (counterclockwise in FIGS. 2 and 3) when the jack cylinder 41 is in the most-contraction state. The jack weight 45 is incorporated into the jack body 40 to make the actual center of gravity of the jack body 40 closer to the cylinder rotation axis 41a than the center of gravity of the jack body 40 when the jack body 40 would not include the jack weight 45, preferably attached to the jack cylinder 41 detachably. The jack weight 45 is attached to, for example, the end of the cylinder tube 41t on the cylinder proximal side Cz1 as specifically described later. The jack weight 45 may be either formed integrally with the cylinder tube 41t or built in the cylinder tube 41t.

The assistance mechanism 50 assists the jack body 40 to rotate about the cylinder rotation axis 41a relatively to the arm 30. The assistance mechanism 50, specifically, reduces a rotational operation force Fm required for an operator to manually (by human power) rotate the jack body 40. At least a part of the assistance mechanism 50 is disposed within the disposition space S2 internal of the arm 30. Preferably, the whole or substantially the whole of the assistance mechanism 50 is disposed in the disposition space S2.

Figure 6:
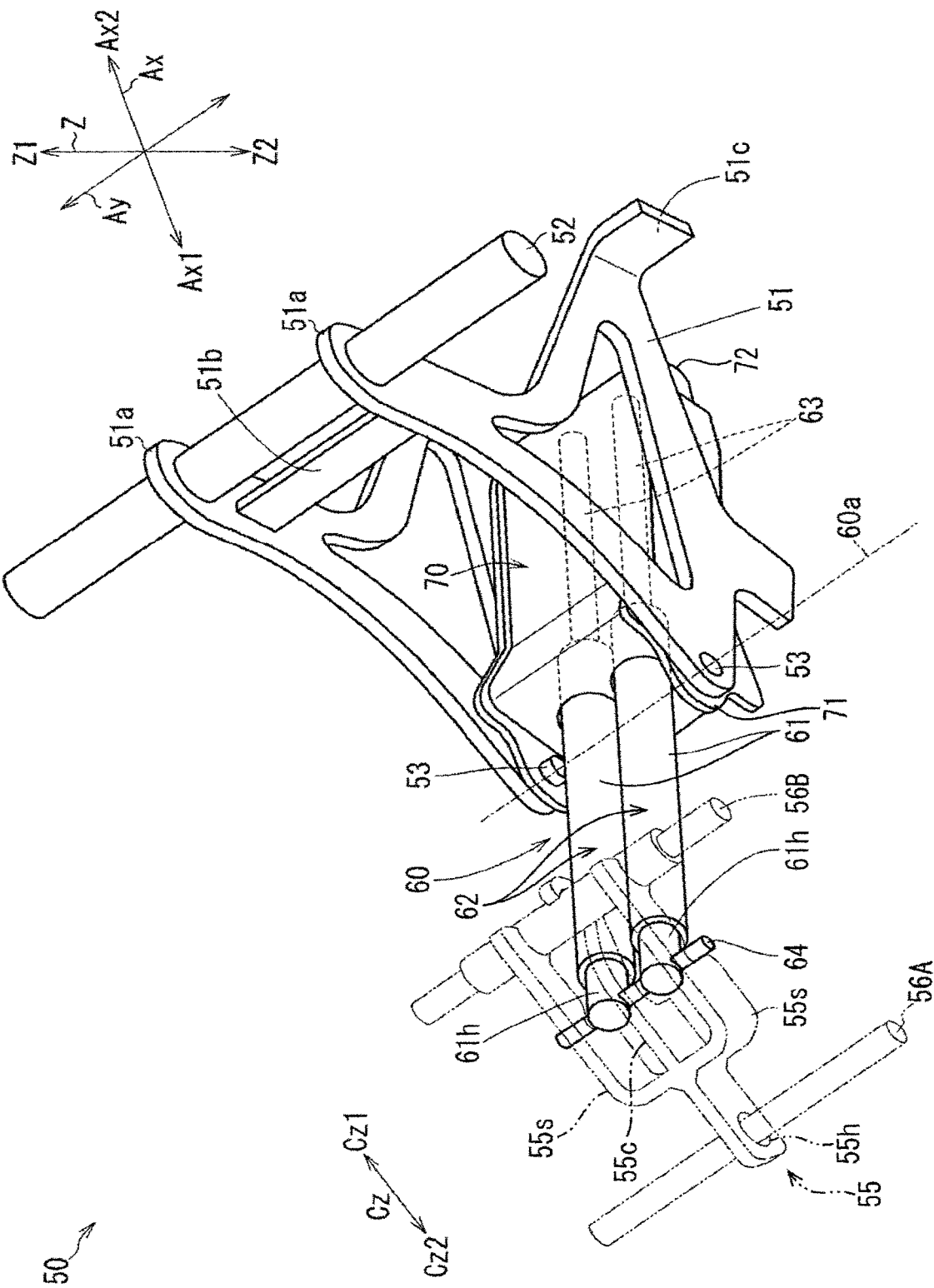
FIG. 6 is a perspective view of the assistance mechanism shown in FIG. 4.

As shown in FIG. 6, the assistance mechanism 50 includes an arm connection member 51, an arm-side pin 53, a cylinder-side engagement member 55, a reaction-force application unit 60, and a cover 70. The arm connection member 51 and the arm-side pin 53 connect the reaction-force application unit 60 to the arm 30 so as to render the reaction-force application unit 60 rotatable relatively to the arm 30 about a center axis extending in the cylinder width direction. The cylinder width direction is a direction orthogonal to the cylinder expansion-contraction direction Cz, being a direction parallel to the arm width direction Ay, in the present embodiment. The cylinder-side engagement member 55 is a member to be engaged with the reaction-force application unit 60 so as to transmit a force from the jack cylinder 41 to the reaction-force application unit 60 while allowing the reaction-force application unit 60 to rotate relatively to the jack cylinder 41 about the axis in the cylinder width direction. The cylinder-side engagement member 55 is indicated by the two-dot line in FIG. 6.

The arm connection member 51 is fixed to the arm 30. The arm connection member 51 shown in FIG. 6 includes a pair of side frames 51a, 51a and a connection part 51b. The pair of side frames 51a, 51a are disposed on both outer sides of the reaction-force application unit 60 with respect to the arm width direction Ay (on left and right outer sides). The connection part 51b interconnects the pair of side frames 51a, 51a. The arm connection member 51 may include a block-like member. The shape of each of the side frames 51a, 51a viewed in the arm width direction Ay is, for example, a substantially triangular shape. The arm connection member 51 may be either connected to the arm 30 detachably (separably from the arm 30) or formed integrally with the arm 30. The separability of the arm connection member 51 from the arm 30 enables assembly performance of the assistance mechanism 50 to be improved. For example, it enables the arm connection member 51 to be connected to the arm 30 after the assembly of at least a part of the assistance mechanism 50 outside the arm 30. This enables the assistance mechanism 50 to be assembled easily in comparison with the case where the assistance mechanism 50 is assembled in the space inside the arm 30.

Each of the side frames 51a, 51a of the arm connection member 51 shown in FIG. 6 includes a contact part 51c, and the arm connection member 51 is connected to the arm 30 through a pin 52 with contact, preferably, surface contact, of contact part 51c with the arm 30. The pin 52 is, for example, connected to the upper part of each of the side frames 51a, 51a and the arm 30 while passing through the upper part and the arm 30. The contact part 51c allows both the number of pins 52 required for stably fixing the arm connection member 51 to the arm 30 and the number of pin holes to allow the pin 52 to be inserted therethrough reduced, thereby making it possible to stabilize the posture of the arm connection member 51 relative to the arm 30 with secure-ment of the high strength of the arm 30. The arm connection member 51, however, may be fixed to the arm 30 through a plurality of pins.

The arm-side pin 53 is a hinge pin for connecting the reaction-force application unit 60 to the arm 30, that is, to the arm connection member 51, so as to allow the reaction-force application unit 60 to rotate, in the present embodi-ment, about an axis in the arm width direction Ay. The arm-side pin 53 is attached to the arm 30 through the arm connection member 51. The arm-side pin 53 is, for example, attached to respective ends of the pair of side frames 51a, 51a of the arm connection member 51 on the arm distal side Ax1. The arm-side pin 53, in the present embodiment, is connected to the reaction-force application unit 60 through the cover 70. The arm-side pin 53, for example, can be provided as respective protrusions that protrude outward from both side surfaces in the arm width direction Ay of the cover 70.

Figure 4:
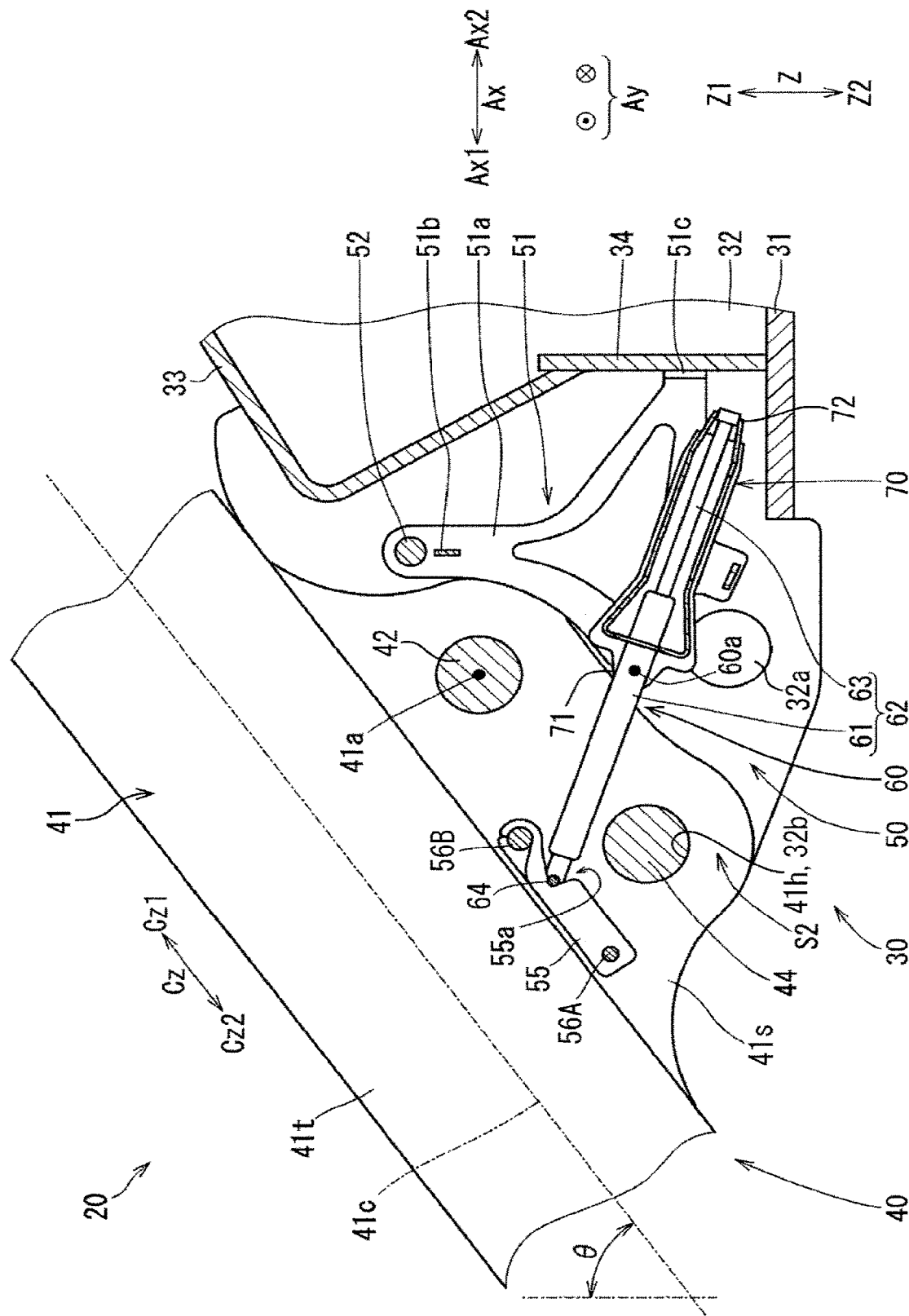
FIG. 4 is a cross-sectional view showing an assistance mechanism in the jack device that is being in the storage posture.
Figure 5:
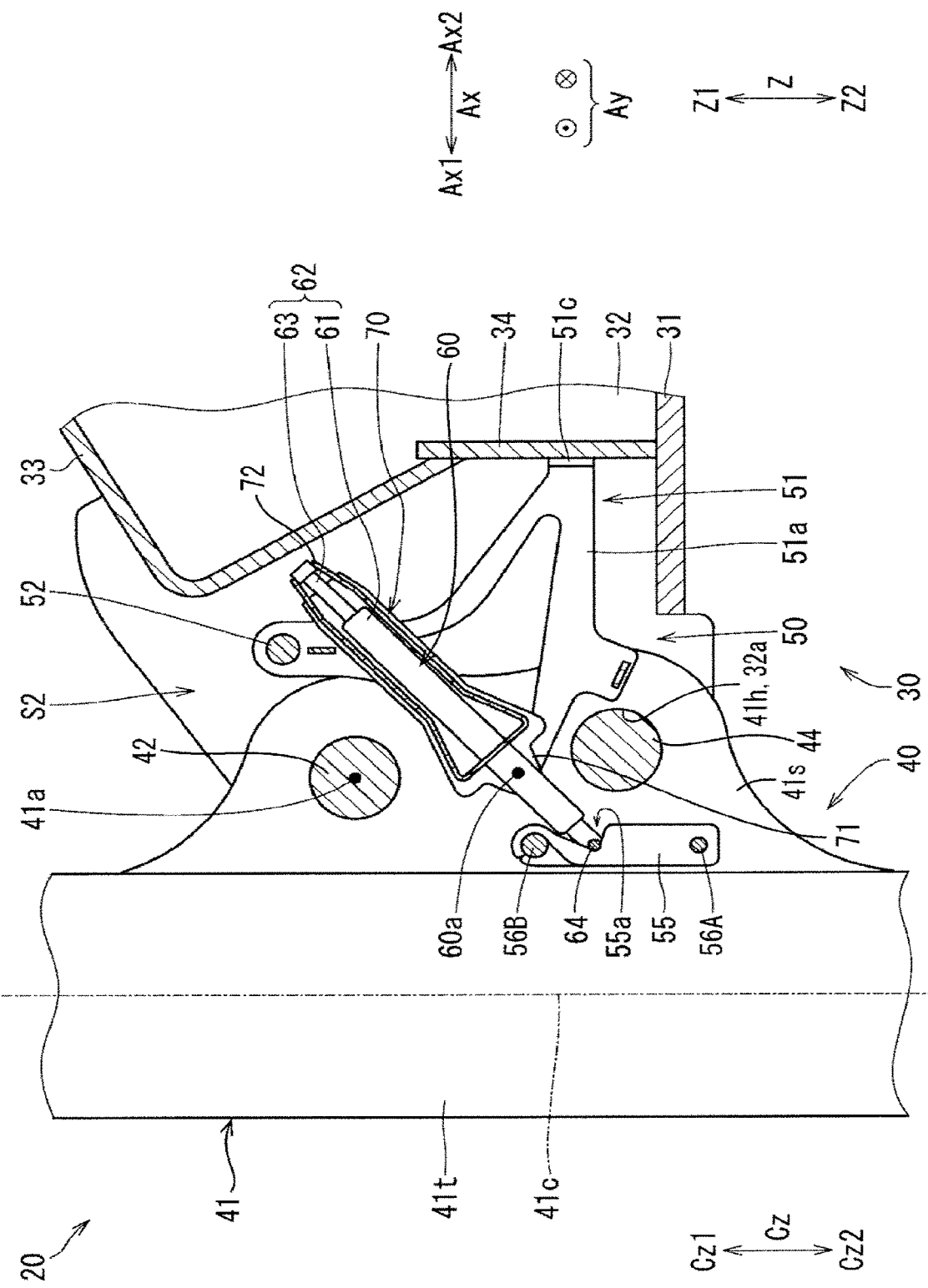
FIG. 5 is a cross-sectional view showing the assistance mechanism in the jack body that is being in the upright posture.

The cylinder-side engagement member 55 is engaged with the reaction-force application unit 60 while being fixed to the jack cylinder 41 shown in FIG. 4, thereby allowed to transmit a force from the jack cylinder 41 to the reaction-force application unit 60 and to transmit a reaction force from the reaction-force application unit 60 to the jack cylinder 41.

The cylinder-side engagement member 55 illustrated in FIG. 6 integrally includes a center arm 55c and a pair of side arms 55s and 55s. On the other hand, the reaction-force application unit 60 includes a pair of reaction-force appli-cation members 62, 62 arranged in the arm width direction Ay, as will be specifically described below. The center arm 55c is attached to the lug part 41s of the jack cylinder 41 through a pair of first pin 56A and second pin 56B in a posture where the center arm 55c extends in the cylinder expansion-contraction direction Cz while being located between the pair of reaction-force application members 62, 62 as shown in FIG. 6. The pair of side arms 55s, 55s are branched from the center arm 55c to both outer sides with respect to the arm width direction Ay, respectively, and disposed on both outer sides of the pair of reaction-force application members 62, 62 with respect to the arm width direction Ay. As shown in FIGS. 4 to 6 and 8, the center arm 55c of the cylinder-side engagement member 55 has a first end part to be connected to the lug part 41s through the first pin 56A and a second end part, which is opposite to the first end part, to be connected to the lug part 41s through the second pin 56B. Each of the side arms 55s, 55s has an end part to be connected to the lug part 41s through the second pin 56B as well as the second end part. As shown in FIG. 6, the first end part of the center arm 55c is provided with a pin insertion hole 55h that allows the first pin 56A to be inserted therethrough. Between the inner peripheral surface enclosing the pin insertion hole 55h and the outer peripheral surface of the first pin 56A is given a gap, by which a slight relative displacement to the jack cylinder 41 is allowed for the cylinder-side engagement member 55.

The reaction-force application unit 60 passively makes a reaction force act on the jack body 40. Specifically, the reaction-force application unit 60 generates a reaction force in response to a force applied from the jack cylinder 41 of the jack body 40, and applies the generated reaction force to the jack cylinder 41. The reaction force assists the jack body 40 in rotation about the cylinder rotation axis 41a. The reaction-force application unit 60 is, thus, an assistance force generation mechanism. The reaction-force application unit 60 is supported by the arm 30. For example, the reaction-force application unit 60 is attached to the arm 30 rotatably about a reaction-force-application-unit rotation axis 60a. The reaction-force-application-unit rotation axis 60a is an axis extending in the arm width direction Ay, i.e., an axis parallel to the cylinder rotation axis 41a. The reaction-force application unit 60 according to the present embodiment is supported by the arm 30 shown in FIG. 4 through the cover 70, the arm-side pin 53, and the arm connection member 51 shown in FIG. 6. The reaction-force application unit 60 is engaged with the jack cylinder 41 so as to be rotatable relatively to the jack cylinder 41 about an axis in the cylinder width direction. The engagement allows a force to be transmitted between the reaction-force application unit 60 and the jack cylinder 41. The reaction-force application unit 60 may be connected to the jack cylinder 41 either inseparably or separably. The pair of reaction-force application members 62 of the reaction-force application unit 60 according to the present embodiment makes a force act on the jack cylinder 41 through the engagement pin 64 and the cylinder-side engagement member 55 (for example, presses the jack cylinder 41 thereagainst).

The reaction-force application unit 60 according to the present embodiment, as described above, includes the pair of reaction-force application members 62, 62 shown in FIG. 6. The reaction-force application members 62, 62 have respective longitudinal directions equal to each other, each being expandable and contractable in the longitudinal direction. The reaction-force application unit according to the present invention may include either only a single reaction-force application member or three or more reaction-force application members.

The reaction-force application unit 60 is disposed in the disposition space S2 defined internally of the arm 30. It is necessary to prevent the reaction-force application unit 60 from interference with another member, such as the cylinder fixing pin 44 or the arm 30, involved by the rotation of the reaction-force application unit 60 relative to the arm 30 about the reaction-force-application-unit rotation axis 60a. It is preferable therefor to render the rotational trajectory of the reaction-force application unit 60 about the reaction-force-application-unit rotation axis 60a, that is, the area through which the reaction-force application unit 60 passes, as small as possible. Specifically, it is preferable to locate the reaction-force-application-unit rotation axis 60a in the center region of the reaction-force application unit 60 with respect to the longitudinal direction of the reaction-force application unit 60, more specifically, the longitudinal direction of each of the reaction-force application members 62, 62 included in the reaction-force application unit 60. The center region is the intermediate region of three regions obtained by dividing the reaction-force application member 62 in the state of being most extended into three equal portions in the longitudinal direction. The reaction-force-application-unit rotation axis 60a illustrated in FIG. 4 is located at a position coincident or substantially coincident with the midpoint of the most extended reaction-force application member 62 with respect to the longitudinal direction.

The reaction-force application unit 60 is a passive device that generates a reaction force corresponding to an external force only when the external force is applied to the reaction-force application unit 60. In other words, the reaction-force application unit 60 differs from an active device, such as a hydraulic cylinder or an air cylinder, that converts energy, such as fluid pressure or power, into power to move other members.

Each of the reaction-force application members 62, 62 included in the reaction-force application unit 60 according to the present embodiment is composed of a gas spring that utilizes the elasticity of a gas (e.g., an inert gas). Specifically, each of the reaction-force application members 62, 62 includes a gas housing 61 and a piston rod 63.

The gas housing 61 is a cylindrical container with a center axis in a gas-spring expansion-contraction direction, filled with a gas for generating the reaction force, namely, a reaction-force generation gas. The gas-spring expansion-contraction direction is coincident with the longitudinal direction of the reaction-force application member 62, namely, the gas spring. The reaction-force generation gas may be accumulated in a member other than the reaction-force application member 62, for example, an accumulator. The gas housing 61 has opposite end parts in the gas-spring expansion-contraction direction, namely, a head-side end part 61h and a rod-side end part 61r.

The piston rod 63 integrally includes a piston loaded in the gas housing 61 and a rod extending in the gas spring expansion-contraction direction from the piston, the rod protruding out of the gas housing 61 through the rod-side end part 61r of the gas housing 61. The piston rod 63 is capable of relative movement to the gas housing 61 in the gas-spring expansion-contraction direction, which movement causes the entire reaction-force application member 62 to be expanded and contracted in the gas-spring expansion-contraction direction. The reaction-force application member 62 has a characteristic of a typical gas spring, that is, the characteristic of being expandable and contractable in the gas-spring expansion-contraction direction and generating a substantially constant reaction force regardless of the stroke in the gas-spring expansion-contraction direction.

The engagement pin 64 transmits a force between the jack cylinder 41 and the gas housing 61. The engagement pin 64 is fixed to respective head end parts 61h of the gas housings 61 of the pair of reaction-force application members 62. The engagement pin 64 extends in a direction orthogonal to the gas-spring expansion-contraction direction, specifically, in a direction parallel to the cylinder width direction, to penetrate the respective head-side end parts 61h of the pair of reaction-force application members 62 in the cylinder width direction. The engagement pin 64 is engaged with the cylinder-side engagement member 55 to allow a force to be transmitted between the gas housing 61 and the cylinder-side engagement member 55. Specifically, each of the center arm 55c and the pair of side arms 55s, 55s of the cylinder-side engagement member 55 is formed with a recess 55a, with which the engagement pin 64 is fitted. The recess 55a includes a slope having a shape with a depth increased with a displacement from the cylinder distal side Cz2 of the jack cylinder 41 toward the cylinder proximal side Cz1, allowing the engagement pin 64 to smoothly reach the bottom of the recess 55a along the slope. The recess 55a may be replaced with a pin hole formed in the cylinder-side engagement member 55 or the lug part 41s to allow the engagement pin 64 to be inserted through the pin hole. The above-described engagement between the engagement pin 64 and the recess 55a, however, facilitates assembly of the jack device 20.

The cover 70 covers at least a part of the reaction-force application unit 60 to thereby improve the weather resistance of the reaction-force application unit 60. The cover 70 illustrated in FIG. 6 has a box-shape and internally houses at least a part of the reaction-force application unit 60. Specifically, the cover 70 covers the piston rod 63 so as to receive at least a part of the piston rod 63, preferably, the whole of the piston rod 63. The cover 70, more preferably, covers both of the piston rods 63 of the pair of reaction-force application members 62, 62. The cover 70, further preferably, houses a part of the gas housing 61 in addition to the piston rods 63. The cover 70 illustrated in FIG. 6 houses the piston rod 63 and the rod-side end part 61r of the gas housing 61. The interior of the cover 70 may be either sealed or communicated with the exterior through a gap. For example, there may be a gap between the cover 70 and respective outer surfaces of the pair of reaction-force application members 62, 62 (more specifically, respective outer peripheral surfaces of the gas housings 61). The gap may be provided with a member for closing the gap (for example, sponge rubber, etc.). Since rain or the like hardly enters the cover 70 from the lower side, at least a part of the lower part of the cover 70 may be opened, for example, as shown in FIG. 4.

The cover 70 according to the present embodiment serves as also a link interconnecting the arm-side pin 53 and the reaction-force application unit 60. In detail, the cover 70 interconnects the arm-side pin 53 and respective piston rods 63 of the pair of reaction-force application members 62, 62 in the reaction-force application unit 60. Specifically, the cover 70 has a distal end part 71 on the arm distal side Ax1 and a proximal end part 72 on the arm proximal side Ax2 with respect to the arm rotation-radius direction Ax, and the distal end part 71 is connected to the arm connection member 51 through the arm-side pin 53 rotatably about the reaction-force-application-unit rotation axis 60a, which is the center axis of the arm-side pin 53, while the distal end part of the piston rod 63 is fixed to the proximal end part 72. This allows the gas housing 61 of each of the reaction-force application members 62, 62 to make relative movement to the cover 70 in the gas-spring expansion-contraction direction, which is the longitudinal direction of the reaction-force application member 62, with the expansion and contraction of the reaction-force application member 62.

The action of each of the jack devices 20 is as follows.

When the work machine 1 shown in FIG. 1 is transported and when work is performed by the work machine 1, each of the jack devices 20 is shifted to the storage state indicated by the dashed line in FIG. 1 and shown in FIG. 2, i.e., the state of being stored in the storage space S1. In the storage state, the arm 30 is disposed along the side wall 13c of the car body 13 in the machine body 10. This renders the arm rotation-radius direction Ax of the arm 30 coincident with or substantially coincident with the machine lateral direction of the machine body 10. Meanwhile, the jack body 40 in the jack device 20 is brought into a storage posture, in which the cylinder fixing pin 44 is inserted into the second pin insertion holes 32b of the pair of arm side walls 32, 32 in the arm 30 and the pin insertion hole 41h of the lug part 41s in the jack cylinder 41, thereby restricting the rotation of the jack body 40 relative to the arm 30 about the cylinder rotation axis 41a to hold the jack body 40 in the storage posture. In the storage state, the float 43 of the jack body 40 is allowed to be left connected to the cylinder rod 41r through the float connection pin 46. In short, float incorporation storage can be done. The present invention, however, does not absolutely require the float incorporation storage. In other words, it is not excluded to remove the float 43 from the cylinder rod 41r in the storage state.

Each of the jack devices 20 is shifted from the storage state to the use state as follows. First, the arm 30 is rotated about the arm rotation axis 30a relatively to the machine body 10 to be thereby deployed into a projection position indicated by the solid line in FIG. 1 from a storage position indicated by the dashed line in FIG. 1. This renders the arm rotation-radius direction Ax substantially coincident with the machine front-rear direction. Next, the cylinder fixing pin 44 is extracted from the first pin insertion hole 32a of the arm 30 and the pin insertion hole 41h of the jack cylinder 41. This allows the jack body 40 including the jack cylinder 41 to rotate relatively to the arm 30 about the cylinder rotation axis 41a in the direction to approach the upright posture shown in FIG. 3 from the storage posture. The rotation of the jack body 40 is manually performed by an operator (by human power), as will be described in detail later. In this state where the jack body 40 has thus reached the upright posture shown in FIG. 3, the cylinder fixing pin 44 is inserted through the first pin insertion holes 32a of the pair of arm side walls 32, 32 in the arm 30 and the pin insertion hole 41h of the jack cylinder 41, thereby holding the jack body 40 in the upright posture. In this upright posture, the jack cylinder 41 is driven in the expansion direction, specifically, the cylinder rod 41r of the jack cylinder 41 is moved relatively to the cylinder tube 41t toward the cylinder distal side Cz2, whereby the bottom surface of the float 43 reaches the ground. The jack cylinder 41 is further expanded to thereby lift up the machine body 10 relatively to the ground.

Each of the jack devices 20 can be returned to the storage state from the use state by a reverse action to the above action. Specifically, the jack cylinder 41 is contracted to land the machine body 10 on the ground, and the jack cylinder 41 is further contracted, for example, to the most-contraction state to thereby float up the float 43 from the ground. The cylinder fixing pin 44 is then extracted out of the first pin insertion holes 32a of the arm 30 and the pin insertion hole 41h of the jack cylinder 41, thereby allowing the jack body 40 including the jack cylinder 41 to rotate relatively to the arm 30 about the cylinder rotation axis 41a in the direction to return to the storage posture shown in FIG. 2 from the upright posture. The rotation of the jack body 40 is also manually performed by an operator as will be specifically described below. In the state where the jack cylinder 41 has been returned to the storage posture shown in FIG. 2, the cylinder fixing pin 44 is inserted through the second pin insertion holes 32b of the arm 30 and the pin insertion hole 41h of the jack cylinder 41, thereby holding the jack body 40 including the jack cylinder 41 in the storage posture. In this state, the arm 30 is rotated about the arm rotation axis 30a to reach the storage position to lie along the side wall 13c in the storage space S1, whereby the jack device 20 is returned to the storage state.

Figure 7:
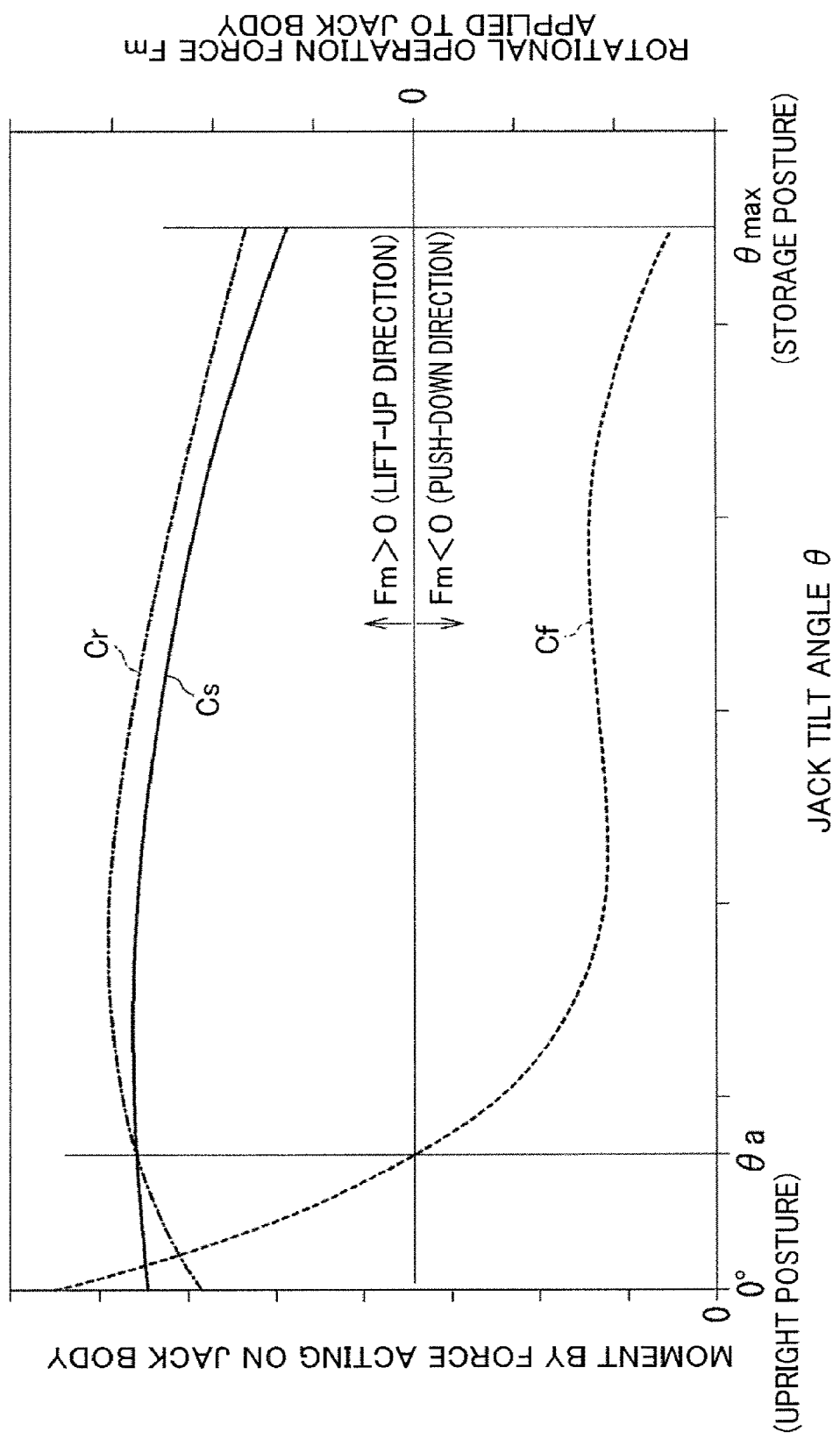
FIG. 7 is a graph showing the relationship between the jack tilt angle θ of the jack body and the force associated with the jack body.

FIG. 7 shows curves Cs, Cr, and Cf that indicate respective characteristics of the self-weight moment Ms, the reaction-force moment Mr, and the rotational operation force Fm, for the jack tilt angle θ shown in FIG. 2, respectively.

Each of the self-weight moment Ms and the reaction-force moment Mr is a moment caused by a force acting on the jack body 40 shown in FIG. 2, about the cylinder rotation axis 41*a*.

The self-weight moment Ms is a moment caused by the self-weight of the jack body 40, i.e., a moment caused by gravity acting on the jack body 40, having a direction to make the jack body 40 closer to the upright posture shown in FIG. 2 from the storage posture shown in FIG. 2 (counterclockwise in FIGS. 2 and 3) when the jack cylinder 41 is in the most contraction state. In the case where the jack body 40 is rotated about the cylinder rotation axis 41*a* while the float 43 is left connected to the cylinder rod 41*r*, the self-weight of the jack body 40 includes the self-weight of the float 43. In the case where the jack body 40 includes the jack weight 45, the self-weight of the jack body 40 includes the self-weight of the jack weight 45. In general, the center of gravity of the jack body 40 is deviated from the cylinder rotation axis 41*a*, and the distance therebetween is the moment radius of the self-weight moment Ms. Moreover, the rotation of the jack body 40 about the cylinder rotation axis 41*a* changes the positional relationship between the center of gravity of the jack body 40 and the cylinder rotation axis 41*a*, thereby changing the moment radius. Specifically, in the example shown in FIG. 7, the self-weight moment Ms is local maximum at a particular jack tilt angle θ, and the curve Cs indicating the characteristic thereof is convex upward.

The reaction-force moment Mr is a moment caused by a reaction force that the reaction-force application unit 60 applies to the jack cylinder 41, having a direction to make the jack body 40 including the jack cylinder 41 closer to the storage posture (clockwise in FIG. 2 and FIG. 3). The reaction-force-application-unit rotation axis 60*a* is set at a position deviated from the cylinder rotation axis 41*a* in a direction orthogonal to the cylinder rotation axis 41*a*, and the length of a perpendicular line drawn down from the cylinder rotation axis 41*a* to the center axis of the reaction-force application member 62 in FIG. 4 is the moment radius of the reaction-force moment Mr. Moreover, the rotation of the jack body 40 about the cylinder center axis 41*c* changes a reaction-force application angle, which is the angle of the longitudinal direction of the pair of reaction-force application members 62 of the reaction-force application unit 60, i.e., the gas-spring expansion-contraction direction, to the cylinder expansion-contraction direction Cz. For example, compared to respective reaction-force application angles when the jack tilt angle θ is 0° (the angle corresponding to the upright posture) and when the jack tilt angle θ is the maximum angle θmax (the angle corresponding to the storage posture), the reaction-force application angle is great at the intermediate jack tilt angle θ therebetween. The reaction-force moment Mr, therefore, is great at the intermediate jack tilt angle θ as compared with the cases where the jack tilt angle θ is 0° and the maximum angle θmax. Hence, as shown in FIG. 7, the curve Cr indicating the characteristic of the reaction-force moment Mr for the jack tilt angle θ is convex upward like the curve Cs indicating the characteristic of the self-weight moment Ms.

The rotational operation force Fm is a force required to be made act on the jack body 40 manually by an operator to rotate the jack body 40 about the cylinder rotation axis 41*a*. The characteristic of the rotational operation force Fm indicated by the curve Cf in FIG. 7 assumes that the rotational operation force Fm is applied to the lower part of the jack cylinder 41 in the jack body 40.

The reaction-force application unit 60 is set to allow the reaction-force moment Mr and the self-weight moment Ms to satisfy the following first and second conditions. The first condition is that the reaction-force moment Mr is greater than the self-weight moment Ms of the jack body 40 in the storage posture. The second condition is that the self-weight moment Ms of the jack body 40 in the upright posture is greater than the reaction-force moment Mr, that is, the reaction-force moment Mr is smaller than the self-weight moment Ms in the upright posture. For satisfaction of both the first and second conditions, it is required that the magnitude relationship between the reaction-force moment Mr and the self-weight moment M is reversed odd number of times (once in the example shown in FIG. 7) during the change in the jack tilt angle θ from the minimum angle of 0° to the maximum angle θmax, i.e., that the curves Cr, Cs shown in FIG. 7 meet at odd number of points.

The satisfaction of the first condition, which is the condition that the reaction-force moment Mr is greater than the self-weight moment Ms when the jack body 40 is in the storage posture, enables the jack body 40 to maintain the storage posture, i.e., to have the stabilized posture, with no need for an operator to lift up the jack body 40, i.e., to apply the rotational operation force Fm to the jack body 40. In other words, the jack body 40 does not rotate in a direction to approach the upright posture shown in FIG. 3 without application of a rotational operation force F to an appropriate part of the jack body 40, specifically, a part on the arm distal side Ax1 of the cylinder rotation axis 41*a*, in a push-down direction or application of a rotational operation force F to a part on the arm proximal side Ax2 of the cylinder rotation axis 41*a* in a push-up direction, by an operator. This enables an operator to perform insertion and removal of the cylinder fixing pin 44 while leaving the hand away from the jack body 40, thereby allowing the insertion and removal to be performed by a single operator.

By application of a rotational operation force Fm to an appropriate part of the jack body 40 in the storage posture by an operator, the jack body 40 is rotated in a direction to approach the upright posture shown in FIG. 3. This rotation of the jack body 40 from the storage posture to the upright posture involves only a small difference between the reaction-force moment Mr and the self-weight moment Ms. This allows the rotational operation force Fm required for the rotation to be reduced. The rotational operation force Fm required to be made act on the jack cylinder 41 in the push-down direction by an operator, although depending on the weight of the jack body 40 and the like, can be reduced, in general, to a few kilograms (e.g., about 7 kg). This allows the operation to be made only by a single operator.

The coincidence of the jack tilt angle θ with a balance angle θa as shown in FIG. 7 renders the self-weight moment Ms and the reaction-force moment Mr equal to each other. This enables an operator to rotate the jack body 40 about the cylinder rotation axis 41*a* by only making a small rotational operation force Fm act on the jack body 40. The rotational operation force Fm is, for example, a slight one such as a resistance force due to damper action of the reaction-force application member 62 and a frictional force between the jack body 40 and the arm 30. The characteristic shown in FIG. 7, where the rotational operation force Fm is small enough to be negligible, involves regarding the rotational operation force Fm when the jack tilt angle θ is equal to the balance angle θa as 0.

When the jack tilt angle θ is smaller than the balance angle θa, that is, when the jack body 40 is in a posture closer to the upright posture shown in FIG. 3 than the posture corresponding to the balance angle θa, the self-weight moment Ms is greater than the reaction-force moment Mr. This causes the jack body 40 to be rotated in a direction to approach the upright posture by the self-weight moment Ms due to the weight of the jack body 40, even if an operator makes no operation force Fm on the jack body 40 in the push-down direction, that is, an operator releases the hand from the jack body 40.

The satisfaction of the second condition, which is the condition that the self-weight moment Ms is greater than the reaction-force moment Mr when the jack body 40 is in the upright posture shown in FIG. 3, causes the jack body 40 to automatically maintain itself in the upright posture, that is, to be kept stable. At this time, the jack body 40 is not rotated in a direction to approach the storage posture shown in FIG. 2 from the upright posture without application of the rotational operation force Fm in a lift-up direction to the jack body 40 by an operator. This enables an operator to perform insertion and removal of the cylinder fixing pin 44 while leaving the hand away from the jack body 40, thereby allowing the insertion and removal to be performed only by a single operator.

By application of a rotational operation force Fm in the push-up direction to an appropriate part of the jack body 40 in the upright posture by an operator, the jack body 40 is rotated in a direction to approach the storage posture shown in FIG. 3. The rotational operation force Fm required to be made act on the jack cylinder 41 in the push-down direction by an operator, although depending on the weight of the jack body 40, etc., can be reduced, in general, to a few kilograms (e.g., about 5 kg). This allows the operation to be made only by a single operator.

When the jack tilt angle θ is greater than the balance angle θa, that is, when the jack body 40 is in a posture closer to the storage posture shown in FIG. 2 than the angle corresponding to the balance angle θa, the reaction-force moment Mr is greater than the self-weight moment Ms. This causes the jack body 40 to be rotated in a direction to approach the storage posture shown in FIG. 3 by the reaction force applied to the jack body 40 by the reaction-force application unit 60 to reach the storage posture, even if an operator makes no rotational operation force Fm act on the jack body 40 in the push-up direction, that is, even if the operator releases the hand from the jack body 40.

For effective reduction in the rotational operation force Fm, the reaction-force application unit 60 is required to make the reaction-force moment Mr act on the jack body 40 over the entire range of the jack tilt angle θ, that is, in all postures from the upright posture to the storage posture. Especially to the jack body 40 in the storage posture shown in FIG. 2, the pair of reaction-force application members 62 each being in the substantially most-expansion state are required to apply the necessary reaction force (initial reaction force). Each of the reaction-force application members 62, composed of the gas spring, can reliably apply the initial reaction force to the jack body 40.

For effective reduction in the rotational operation force Fm, it is preferable that the self-weight moment Ms and the reaction-force moment Mr are approximately equal to each other. If each of the reaction-force application members 26 is composed of the gas spring, the reaction-force application unit 60 can have a characteristic of generating a substantially constant reaction force from the most-expansion state to the most-contraction state with respect to the gas-spring expansion-contraction direction. This allows the reaction-force moment Mr to be set to be substantially equal to the self-weight moment Ms.

The weight moment Ms of the jack body 40 is preferably small, which renders the reaction force required of the reaction-force application unit 60 small to allow the reaction-force application unit 60 to be downsized, thereby enabling the reaction-force application unit 60 to be disposed within the limited disposition space S2. The weight moment Ms is decreased with a decrease in the distance between the center of gravity of the jack body 40 and the cylinder rotation axis 41a. There is, however, a limit in setting the position of the cylinder rotation axis 41a so as to make the cylinder rotation axis 41a closer to the center of gravity of the jack body 40. The position of the cylinder rotation axis 41a is restricted by the stroke of the jack cylinder 41, the space to be occupied by the jack cylinder 41 when the jack device 20 is stored in the storage space S1, the strength required by the jack device 20 being used, and the like.

The jack weight 45 makes the center of gravity of the jack body 40 closer to the cylinder rotation axis 41a, thereby allowing the self-weight moment Ms to be small with no change in the position of the cylinder rotation axis 41a. Specifically, the position of the jack weight 45 incorporated in the jack body 40 is set so as to make the actual center of gravity of the jack body 40 including the jack weight 45 closer to the cylinder rotation axis 41a than the center of gravity of the jack body 40 without the jack weight 45. For example, when the center of gravity of the jack body 40 without the jack weight 45 is on the cylinder distal side Cz2 of the cylinder rotation axis 41a, the attachment of the jack weight 45 to a part on the cylinder proximal side Cz1 of the cylinder tube 41t in the jack cylinder 41 can make the center of gravity of the jack body 40 closer to the cylinder center axis 41c to reduce the self-weight moment Ms. This renders the reaction force required to be generated by the reaction-force application unit 60 small to allow the reaction-force application unit 60 to be downsized, thereby enabling the reaction-force application unit 60 to be easily disposed in the limited disposition space S2. Besides, the jack weight 45 improves the flexibility in the design of the position of the reaction-force-application-unit rotation axis 60a and the position of the point at which the reaction force acts on the jack body 40 from the reaction-force application unit 60.

The storage of the jack device 20 into the storage space S1 with connection of the float 43 to the cylinder rod 41r, namely, the float incorporation storage, involves an operation of rotating the jack cylinder 41 about the cylinder rotation axis 41a with the connection of the float 43 to the cylinder rod 41r. The center of gravity of the jack body 40 in which the float 43 is thus connected to the cylinder rod 41r is closer to the cylinder distal side Cz2 than the center of gravity of the jack body 40 in which the float 43 is detached from the cylinder rod 41r to thereby render the self-weight moment Ms great. The jack weight 45, however, can be offset with the mass of the float 43, when being incorporated into the jack body 40 so as to shift the center of gravity of the jack body 40 to the cylinder proximal side Cz1, that is, makes the center of gravity closer to the cylinder rotation axis 41a. This allows the jack body 40 to have the small self-weight moment Ms in spite of including the float 43.

Increasing the angle of the reaction-force application member 62 to the cylinder expansion-contraction direction Cz in the gas-spring expansion-contraction direction, that is, the angle of the direction of the reaction force from the reaction-force application unit 60 to the jack body 40 to the cylinder expansion-contraction direction Cz, namely, the reaction-force application angle, makes it possible to increase the reaction-force moment Mr without increasing the reaction force applied to the jack body 40 from the reaction-force application unit 60. The increase in the reaction-force application angle requires an increase in the angle of the rotation of the reaction-force application unit 60 about the reaction-force-application-unit rotation axis 60a involved by the rotation of the jack cylinder 41 about the cylinder rotation axis 41a. Increasing the rotation angle of the reaction-force application unit 60, however, may hinder the reaction-force application unit 60 from being disposed in the disposition space S2. For example, the location of the reaction-force-application-unit rotation axis 60a at the longitudinal end of the reaction-force application unit 60 renders the swing area of the reaction-force application unit 60 large, which may hinder the reaction-force application unit 60 from being disposed in the disposition space S2. In contrast, the location of the reaction-force-application-unit rotation axis 60a at the center in the longitudinal direction of the reaction-force application unit 60, in the embodiment, renders the space required for allowing the reaction-force application unit 60 to rotate about the reaction-force-application-unit rotation axis 60a small, enabling the reaction-force application unit 60 to be easily disposed in the disposition space S2. The reaction-force-application-unit rotation axis 60a, however, may be disposed in a part other than the longitudinal center part of the reaction-force application unit 60.

Figure 8:
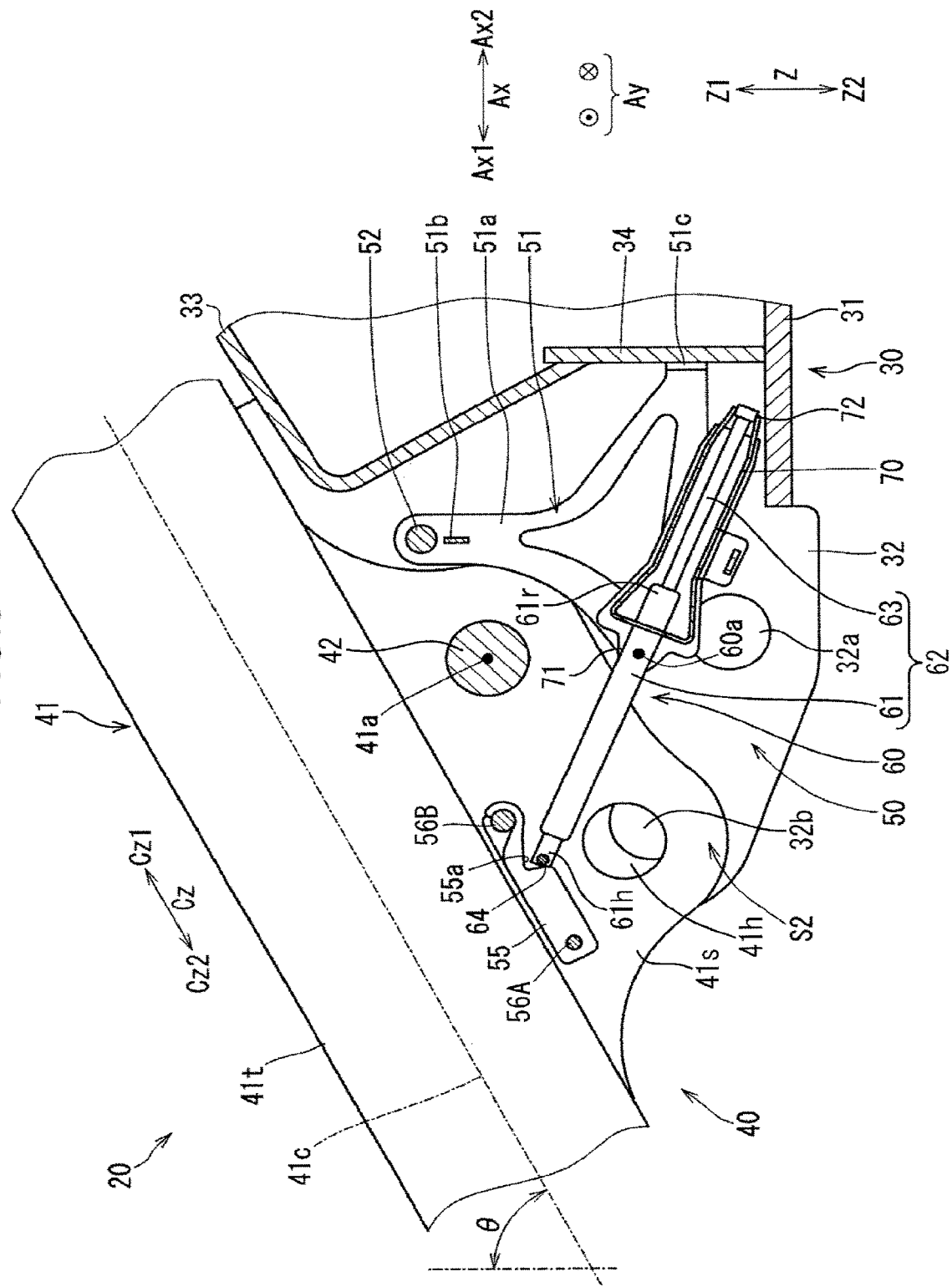
FIG. 8 is a cross-sectional view showing the assistance mechanism in the jack body that is being in an assembly posture.

During the assembly of the jack device 20 (for example, during the manufacturing or maintenance, etc. thereof), the jack body 40 is set in the assembly posture shown in FIG. 8 to allow the reaction-force application unit 60 to be mounted between the arm 30 and the jack cylinder 41. The jack tilt angle θ in the assembly posture is greater than the jack tilt angle θ in the storage posture shown in FIG. 2. In the storage posture shown in FIG. 2, the rotation of the jack cylinder 41 in the direction to increase the jack tilt angle θ is restricted by the cylinder rotation restriction member 33a. However, the removal of the cylinder rotation restriction member 33a from the arm 30 during the assembly allows the jack body 40 to be shifted to the assembly posture with the jack tilt angle θ greater than that in the storage posture. In the state where the jack body 40 is thus set in the assembly posture and the pair of reaction-force application members 62 are most expanded, the reaction-force application unit 60 can be arranged without interference thereof with the jack cylinder 41. The assembly posture is preferably arranged so as to allow the engagement pin 64 to be engaged with and disengaged from the recess 55a of the cylinder-side engagement member 55 with no contraction of the reaction-force application member 62.

To reveal the effect of the reaction-force application unit 60, the following case is assumed in which the jack body 40 is rotated in a direction to approach the upright posture shown in FIG. 3 when an operator releases the hand from the jack body 40 in the storage posture shown in FIG. 2. In this case, in order to rotate the jack body 40 about the cylinder rotation axis 41a to shift the jack body 40 from the upright posture to the storage posture, the operator is required to manually hold the jack cylinder 41 in the storage posture until fixing the jack cylinder 41 to the arm 30 by the cylinder fixing pin 44. Such operation of inserting and removing the cylinder fixing pin 44 while holding the jack body 40 is difficult for only a single operator. Besides, when the operator erroneously releases the hand from the jack cylinder 41 to allow the jack cylinder 41 to be rotated in the direction to return to the upright posture shown in FIG. 3, the operator is required to perform further operation of lifting up the jack cylinder 41. Moreover, in order to prevent the operator's hand or the like from coming into contact with the jack cylinder 41 from which the operator has erroneously released the hand to allow the jack cylinder 41 to be rotated, the operator has to perform the operation carefully with much time and effort.

Assumed is a case of using a coil spring to assist the jack body 40 to rotate from the upright posture to the storage posture, for example, a case of attaching the coil spring to the cylinder support shaft 42. In this case, to allow sufficient assistance force to be applied from the coil spring to the jack body 40 in the storage posture, an operation is required for attaching the coil spring to the cylinder support shaft 42 while bringing the coil spring into a large excess compression (initial compression), but such operation is not easy. Reducing the excess compression to allow the operation to be done involves insufficiency of assistance force to be applied to the jack body 40 in the storage posture, increasing the burden of the work of rotating the jack body 40.

To provide the characteristic of the reaction-force moment Mr as indicated by the curve Cr in FIG. 7, the reaction-force application unit 60 is required to generate a sufficient reaction force (initial reaction force) in the storage state shown in FIG. 2. The reaction-force application unit 60 is further required to generate a relatively constant reaction force over a wide range from the storage posture to the upright posture. Although using a coil spring having a weak spring constant in a greatly deformed state, in place of the gas spring, may provide a characteristic of the reaction-force moment Mr as shown in FIG. 7, this requires great deformation in the spring material forming the coil spring with the weak spring constant and typical spring materials do not have sufficient strength to withstand such deformations, which may cause plastical deformation therein. In contrast, the reaction-force application member 62 composed of a gas spring can provide the characteristic of the reaction-force moment Mr shown in FIG. 7 without the above-described inconvenience. The specific configuration of the reaction-force application unit 60, however, is not limited except for the first and second conditions, allowed to include, for example, a coil spring.

A jack device is, thus, provided, being mountable on a machine body of a work machine to lift up the machine body. The jack device includes an arm, a jack body, and a reaction-force application unit. The arm is mountable on the machine body so as to be rotatable about an arm rotation axis extending in a machine up-down direction, which is an up-down direction of the machine body. The jack body includes a jack cylinder expandable and contractable in a cylinder expansion-contraction direction, attached to the arm rotatably about a cylinder rotation axis to be shiftable between an upright posture and a storage posture. The upright posture is a posture where the machine body can be lifted up by expansion of the jack cylinder. The storage posture is a posture where the cylinder expansion-contraction direction is tilted from the machine up-down direction more largely than the upright posture and the jack cylinder lies along an upper surface of the arm. The reaction-force application unit is supported by the arm and applies a reaction force to the jack body in response to a force applied from the jack body. The reaction-force application unit makes a reaction-force moment act on the jack body in all postures from the upright posture to the storage posture. The reaction-force moment is a moment caused by the reaction force about the cylinder rotation axis, having a direction to make the jack body closer to the storage posture. The reaction-force application unit is configured to make the reaction-force moment greater than a self-weight moment act on the jack body in the storage posture and configured to make the reaction-force moment smaller than the self-weight moment act on the jack body in the upright posture. The self-weight moment is a moment caused by the weight of the jack body about the cylinder rotation axis, having a direction to make the jack body closer to the upright posture.

The reaction-force application unit can be configured by a passive device that applies the reaction-force moment to the jack body in response to a force applied from the jack body in all postures from the upright posture to the storage posture. This allows the frequency of maintenance of and failure in the jack device to be reduced and allows the jack device to have a simple configuration, as compared to the case where the reaction-force application unit is composed of an active device that actively changes the posture of the jack body, such as a hydraulic actuator.

The jack body in the upright posture can be maintained in the upright posture by the self-weight moment greater than the reaction-force moment, without application of an external force to the jack body. The jack body in the storage posture, conversely, can be maintained in the storage posture by the reaction-force moment greater than the self-weight moment, without application of an external force to the jack body. These release an operator from necessity of applying a rotational operation force to the jack body in order to maintain the storage posture in the situation where the jack body has been shifted to the storage posture from the upright posture, and also necessity of applying a rotational operation force to the jack body in order to maintain the upright posture in the situation where the jack body has shifted to the upright posture from the storage posture. The operator is thus enabled to easily perform an operation for changing the posture of the jack body. In addition, the effect can be obtained with no use of any active device for actively changing the posture of the jack body.

Preferably, the reaction-force application unit includes at least one reaction-force application member, which is composed of a gas spring. The gas spring includes a gas housing filled with a reaction-force application gas and generates the reaction force by the reaction-force application gas with expansion and contraction in a gas-spring expansion-contraction direction in response to the force applied from the jack body.

The at least one reaction-force application member composed of the gas spring improves the flexibility in the design of the reaction-force application unit to allow the reaction-force application unit to be easily mounted on the arm. For example, in the case of using a coil spring in place of the gas spring, the coil spring can generate little or no reaction force even with slight contraction from the most expansion state thereof. In contrast, the gas spring can generate a reaction force (initial reaction force) having a suitable magnitude even with slight contraction from the most expansion state. Besides, unlike the coil spring, the reaction-force application member composed of the gas spring can generate a stable reaction force regardless of the stroke in the gas-spring expansion-contraction direction, which makes it easy to set the characteristic of the reaction-force moment generated by the reaction-force application member to a favorable characteristic, for example, to make the characteristic of the reaction-force moment close to the characteristic of the self-weight moment. This improves the flexibility in the design of the reaction-force application unit (e.g., the design of the magnitude of the reaction force, the position of the point at which the reaction force acts on the jack body, the position of the axis about which the reaction-force application unit rotates if it is rotatable, etc.) to satisfy the condition (the first and second conditions in the above embodiment) required of the reaction-force application unit, thereby enabling the reaction-force application unit to be easily disposed in the disposition space defined in the arm.

Besides, the reaction-force application member is enabled to restrain the jack body from steep rotation by the damper effect provided by the gas spring. This reduces the necessity for an operator to keep watch for the steep rotational movement during the operation of shifting the posture of the jack body, thereby enabling the operator to perform the operation more easily.

Preferably, the gas-spring expansion-contraction direction is a longitudinal direction of the reaction-force application member, and the reaction-force application unit is supported by the arm rotatably about a reaction-force-application-unit rotation axis, which is located at a center part of the reaction-force application member with respect to the longitudinal direction. This allows a space required for the rotation of the reaction-force application unit about the counter-force-applying part rotation axis to be reduced.

Preferably, the jack device further includes a cover that covers at least a part of the reaction-force application unit. Specifically, in the case where the gas spring includes the gas housing and a piston rod held by the gas housing capably of relative movement to the gas housing in the gas spring expansion-contraction direction, the cover may be configured to cover at least the piston rod of the gas spring, which restrains the piston rod from being directly exposed to wind or rain. This can improve the weather resistance of the reaction-force application unit and restrain failure from occurring in the reaction-force application unit. The failure includes, for example, occurrence of rust in the piston rod and gas leakage due thereto.

The jack body, preferably, further includes a jack weight. The jack weight is incorporated into the jack body so as to make the center of gravity of the jack body closer to the cylinder rotation axis than the center of gravity of the jack body without the jack weight to thereby reduce the self-weight moment of the jack body. This increases the flexibility in the design of the reaction-force application unit (e.g., the design of the magnitude of the reaction force, the position of the point at which the reaction force acts on the jack body, the position of the reaction-member rotation axis, etc.) for satisfying the conditions required of the reaction-force application, thereby allowing the reaction-force application unit to be easily supported by the arm. Besides, reducing the self-weight moment reduces the reaction force required to be applied by the reaction-force application unit to allow the reaction-force application unit to be downsized, thereby enabling the reaction-force application unit to be easily disposed in the disposition space defined in the arm.

Also is provided a work machine including the machine body and the jack device. The machine body defines a storage space. The jack device is shiftable between a use state where the jack device projects from the machine body to an outside of the storage space to enable expansion of the jack cylinder in the upright posture to lift up the machine body and a storage state where the jack cylinder is stored in the storage space in the storage posture, by a rotation of the arm relative to the machine body about the arm rotation axis.

Example of Modification

The embodiments described above may be variously modified. For example, the arrangement and shape of each component of the above embodiment may be changed. For example, the number of components may be changed and some of the components may not be provided. For example, the fixation, connection, etc. of the components may be direct or indirect. For example, what has been described as a plurality of members or parts different from each other may be one member or part. For example, what has been described as one member or part may be divided into a plurality of members or parts different from each other.

The invention claimed is:

1. A jack device attached to a machine body of a work machine including the machine body to be able to lift up the machine body, the jack device comprising:
   an arm mountable on the machine body so as to be rotatable about an arm rotation axis extending in a machine up-down direction, which is an up-down direction of the machine body;
   a jack body including a jack cylinder expandable and contractable in a cylinder expansion-contraction direction and attached to the arm rotatably about a cylinder rotation axis to be shiftable between an upright posture and a storage posture, the upright posture being a posture where the jack body is capable of lifting up the machine body by expansion of the jack cylinder and the storage posture being a posture where the cylinder expansion-contraction direction is tilted from the machine up-down direction more largely than the upright posture and the jack cylinder lies along an upper surface of the arm; and
   a reaction-force application unit supported by the arm and configured to apply a reaction force to the jack body in response to a force applied from the jack body to make a reaction-force moment act on the jack body in all postures from the upright posture to the storage posture, the reaction-force moment being a moment caused by the reaction force about the cylinder rotation axis and having a direction to make the jack body closer to the storage posture, wherein
   the reaction-force application unit is configured to make the reaction-force moment greater than a self-weight moment act on the jack body in the storage posture and configured to make the reaction-force moment smaller than the self-weight moment act on the jack body in the upright posture, the self-weight moment being a moment caused by a weight of the jack body about the cylinder rotation axis and having a direction to make the jack body closer to the upright posture, and
   the reaction-force application unit includes at least one reaction-force application member composed of a gas spring, which includes a gas housing filled with a reaction-force application gas and configured to generate the reaction force by the reaction-force application gas with expansion and contraction in a gas-spring expansion-contraction direction in response to the force applied from the jack body.

2. The jack device according to claim 1, wherein the gas-spring expansion-contraction direction is a longitudinal direction of the reaction-force application member, and the reaction-force application unit is supported by the arm rotatably about a reaction-force-application-unit rotation axis, which is located at a center part of the reaction-force application member with respect to the longitudinal direction.

3. The jack device according to claim 1, further comprising a cover that covers at least a part of the reaction-force application unit, the gas spring including the gas housing and a piston rod held by the gas housing capably of relative movement to the gas housing in the gas-spring expansion-contraction direction, and the cover covers at least the piston rod of the gas spring.

4. The jack device according to claim 1, wherein the jack body includes a jack weight, which is incorporated into the jack body so as to make the center of gravity of the jack body closer to the cylinder rotation axis than the center of gravity of the jack body without the jack weight.

5. A work machine comprising:
   a machine body defining a storage space; and
   a jack device according to claim 1, the jack device mounted on the machine body, wherein
   the jack device is shiftable between a use state where the jack device projects from the machine body to an outside of the storage space to enable expansion of the jack cylinder in the upright posture to lift up the machine body and a storage state where the jack cylinder is stored in the storage space in the storage posture, by a rotation of the arm relative to the machine body about the arm rotation axis.

* * * * *